US012689680B2

(12) United States Patent
Singh et al.

(10) Patent No.: US 12,689,680 B2
(45) Date of Patent: Jul. 21, 2026

(54) SYSTEMS AND METHODS FOR AUTOMATICALLY ASSIGNING USER PERMISSIONS

(71) Applicant: Honeywell International Inc., Charlotte, NC (US)

(72) Inventors: Ankit Singh, Apex, NC (US); James Daviner, Roseville, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 503 days.

(21) Appl. No.: 18/168,433

(22) Filed: Feb. 13, 2023

(65) Prior Publication Data

US 2024/0275853 A1 Aug. 15, 2024

(51) Int. Cl.
| | |
|---|---|
| *H04L 9/40* | (2022.01) |
| *G06F 21/62* | (2013.01) |
| *H04L 67/306* | (2022.01) |

(52) U.S. Cl.
CPC ............ *H04L 67/306* (2013.01); *G06F 21/62* (2013.01); *G06F 2221/2141* (2013.01)

(58) Field of Classification Search
CPC ...................................................... H04L 63/102
See application file for complete search history.

(56) References Cited

U.S. PATENT DOCUMENTS

| | | | | | |
|---|---|---|---|---|---|
| 7,237,119 | B2 * | 6/2007 | Clark | ................. | G06F 21/6218 713/193 |
| 9,674,194 | B1 * | 6/2017 | McClintock | ............ | H04L 63/12 |
| 9,699,196 | B1 * | 7/2017 | Kolman | .............. | G06F 16/9024 |
| 9,705,931 | B1 * | 7/2017 | Schulze | ................. | G06F 21/31 |
| 10,560,457 | B2 * | 2/2020 | Anderson | ............. | G06F 16/245 |
| 10,637,867 | B2 * | 4/2020 | Rice | ........................ | G06F 16/21 |
| 11,373,472 | B2 * | 6/2022 | Hadzic | .................... | G07C 9/27 |
| 11,706,227 | B2 * | 7/2023 | Faitelson | .............. | H04L 63/104 726/4 |
| 11,790,075 | B1 * | 10/2023 | Oswal | ................... | H04L 63/101 726/6 |
| 2003/0163705 | A1 * | 8/2003 | Richards, Jr. | ....... | G06F 21/6218 713/182 |
| 2004/0093334 | A1 * | 5/2004 | Scherer | ............... | G06F 21/6245 |
| 2004/0268125 | A1 * | 12/2004 | Clark | .................. | G06F 21/6218 726/4 |
| 2005/0246762 | A1 * | 11/2005 | Girouard | .............. | H04L 63/104 726/2 |
| 2007/0203786 | A1 * | 8/2007 | Nation | ............. | G06Q 10/06398 705/7.42 |

(Continued)

OTHER PUBLICATIONS

European search report Mailed on Jun. 14, 2024 for EP Application No. 24156852, 10 page(s).

*Primary Examiner* — Khang Do
(74) *Attorney, Agent, or Firm* — ALSTON & BIRD LLP

(57) ABSTRACT

A method of updating user permissions includes accessing a permissions database including individual user permissions associated with individual user profiles and assigning initial individual user permissions to an individual user profile; assigning the initial individual user profile to an initial profile tranche based on the initial individual user permissions; updating one or more of the individual user permissions based on information associated with the individual user profile; updating the profile tranche based on the updated individual user permissions.

16 Claims, 5 Drawing Sheets

(56)        References Cited

U.S. PATENT DOCUMENTS

| | | | | |
|---|---|---|---|---|
| 2007/0250905 | A1* | 10/2007 | Clark | G06F 21/6218 726/1 |
| 2008/0028449 | A1* | 1/2008 | Shigeeda | G06F 21/608 726/6 |
| 2011/0066852 | A1* | 3/2011 | Takeda | G06F 21/6218 713/168 |
| 2011/0246527 | A1* | 10/2011 | Bitting | G06F 21/604 707/E17.001 |
| 2014/0041005 | A1* | 2/2014 | He | H04L 63/0853 726/7 |
| 2014/0236999 | A1* | 8/2014 | Faitelson | G06F 16/1774 707/785 |
| 2015/0356283 | A1* | 12/2015 | Kress | G06F 21/53 726/17 |
| 2016/0188891 | A1* | 6/2016 | Schlesinger | G06F 21/6218 726/1 |
| 2016/0294881 | A1* | 10/2016 | Hua | H04L 63/20 |
| 2017/0078148 | A1* | 3/2017 | Matsumoto | H04L 41/0813 |
| 2017/0171214 | A1* | 6/2017 | Anderson | H04L 63/102 |
| 2017/0272441 | A1* | 9/2017 | McClintock | H04L 63/12 |
| 2018/0026989 | A1* | 1/2018 | Faitelson | H04L 63/104 726/4 |
| 2018/0314845 | A1* | 11/2018 | Anderson | G06F 21/32 |
| 2019/0082305 | A1* | 3/2019 | Proctor | H04L 63/065 |
| 2019/0230088 | A1* | 7/2019 | Rice | G06F 21/604 |
| 2019/0362101 | A1* | 11/2019 | Fisse | G06F 16/951 |
| 2020/0177386 | A1* | 6/2020 | Mahmood | H04L 63/102 |
| 2020/0403996 | A1* | 12/2020 | Parimi | H04L 63/20 |
| 2020/0404021 | A1* | 12/2020 | Singh | H04L 63/20 |
| 2021/0314342 | A1* | 10/2021 | Oberg | H04L 63/20 |
| 2022/0103566 | A1* | 3/2022 | Faulkner | H04L 67/06 |
| 2022/0114594 | A1* | 4/2022 | Nunes | G06Q 20/4016 |
| 2023/0004468 | A1* | 1/2023 | Hicks | G06F 11/0793 |
| 2023/0267225 | A1* | 8/2023 | Costello | G06F 21/6227 726/27 |
| 2023/0275886 | A1* | 8/2023 | Malik | G06F 21/604 726/17 |
| 2024/0187417 | A1* | 6/2024 | Ghiold | H04L 63/105 |
| 2024/0244060 | A1* | 7/2024 | Garg | H04L 63/104 |
| 2024/0250956 | A1* | 7/2024 | Goff | H04L 63/108 |
| 2024/0275853 | A1* | 8/2024 | Singh | H04L 63/10 |

* cited by examiner

*500*

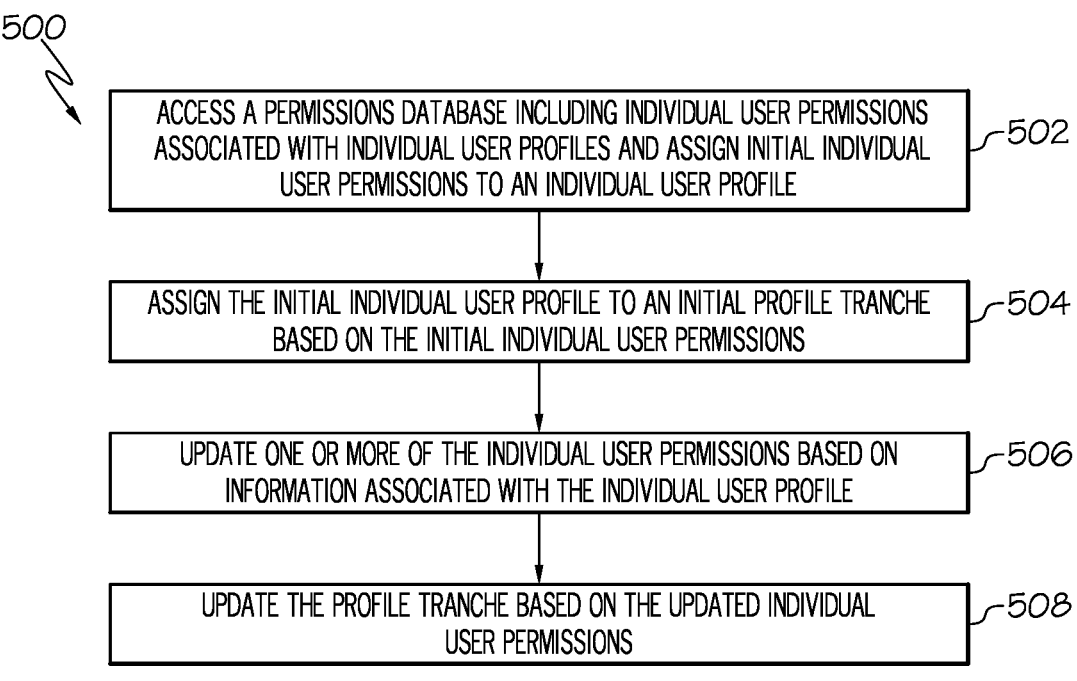

| ACCESS A PERMISSIONS DATABASE INCLUDING INDIVIDUAL USER PERMISSIONS ASSOCIATED WITH INDIVIDUAL USER PROFILES AND ASSIGN INITIAL INDIVIDUAL USER PERMISSIONS TO AN INDIVIDUAL USER PROFILE | 502 |

| ASSIGN THE INITIAL INDIVIDUAL USER PROFILE TO AN INITIAL PROFILE TRANCHE BASED ON THE INITIAL INDIVIDUAL USER PERMISSIONS | 504 |

| UPDATE ONE OR MORE OF THE INDIVIDUAL USER PERMISSIONS BASED ON INFORMATION ASSOCIATED WITH THE INDIVIDUAL USER PROFILE | 506 |

| UPDATE THE PROFILE TRANCHE BASED ON THE UPDATED INDIVIDUAL USER PERMISSIONS | 508 |

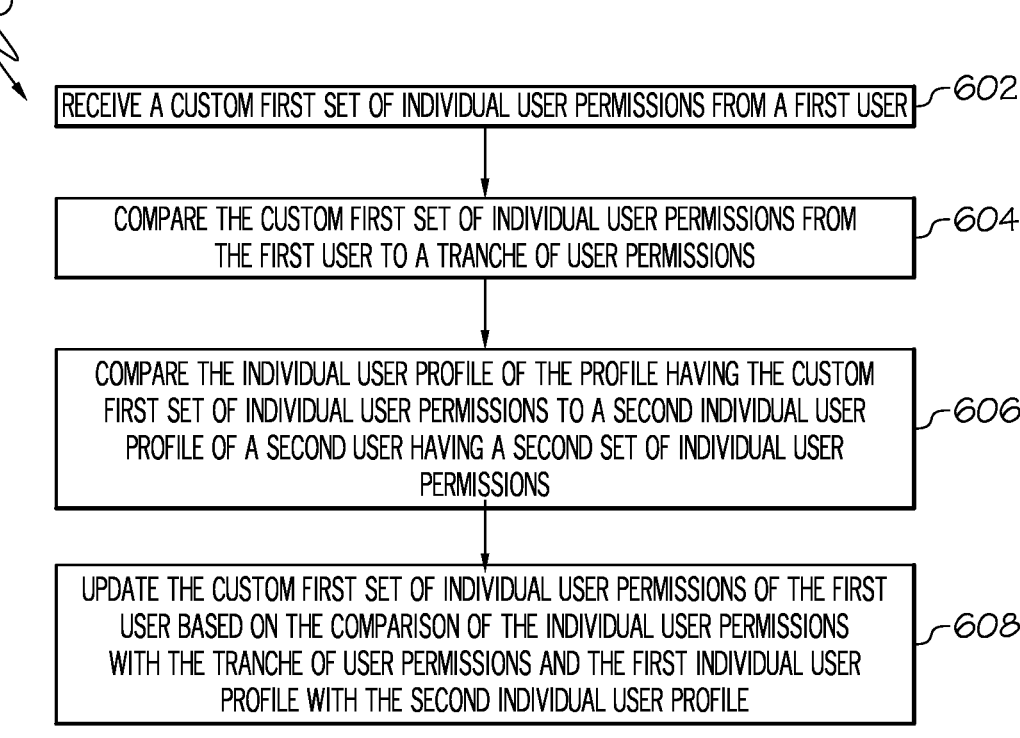

| RECEIVE A CUSTOM FIRST SET OF INDIVIDUAL USER PERMISSIONS FROM A FIRST USER | 602 |

| COMPARE THE CUSTOM FIRST SET OF INDIVIDUAL USER PERMISSIONS FROM THE FIRST USER TO A TRANCHE OF USER PERMISSIONS | 604 |

| COMPARE THE INDIVIDUAL USER PROFILE OF THE PROFILE HAVING THE CUSTOM FIRST SET OF INDIVIDUAL USER PERMISSIONS TO A SECOND INDIVIDUAL USER PROFILE OF A SECOND USER HAVING A SECOND SET OF INDIVIDUAL USER PERMISSIONS | 606 |

| UPDATE THE CUSTOM FIRST SET OF INDIVIDUAL USER PERMISSIONS OF THE FIRST USER BASED ON THE COMPARISON OF THE INDIVIDUAL USER PERMISSIONS WITH THE TRANCHE OF USER PERMISSIONS AND THE FIRST INDIVIDUAL USER PROFILE WITH THE SECOND INDIVIDUAL USER PROFILE | 608 |

FIG. 6

SYSTEMS AND METHODS FOR AUTOMATICALLY ASSIGNING USER PERMISSIONS

TECHNICAL FIELD

The present disclosure relates to automatically assigning user permissions to a user profile, and more specifically, to automatically assigning user permissions to a user profile based on certifications of the user profile.

BACKGROUND

Currently, users may be assigned permissions on an individual level. Accordingly, system administrators must individually update each permission for accessing and editing files such as any particular object, field, or record file within a database. This may be sufficient in systems having a small number of users. However, when a large number of users require access to a system, such individual permission setting can overload system administrators, leading to delays or lack of access to critical systems and functions. Such delays can affect the operations of an organization, especially organizations which require the creation, editing, and approval of large amounts of data.

One such type of organization may be a pharmaceutical company, which may be regulated to provide periodic quality review reports of their various products and services. For example, a pharmaceutical company may be required to produce an Annual Product Quality Review (APQR) report that details quality information associated with its products. Such reports require input and editing from countless users from disparate departments, functions, and roles within a company. For example, a head of accounting may review and edit reports from his or her accounting personnel but may also be required to review and approve sales figures for a particular product from a sales department. Compounding the problem, users may tend to rotate roles within and without the organization due to events such as natural turnover in staff, promotions, hiring cycles, etc. Such turnover can require frequent updates to permissions and user account metadata, which may be untenable for a system administrator(s). Accordingly, systems and methods for automatically assigning user permissions may be required.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method of updating user permissions includes accessing a permissions database including individual user permissions associated with individual user profiles and assigning initial individual user permissions to an individual user profile; assigning the initial individual user profile to an initial profile tranche based on the initial individual user permissions; updating one or more of the individual user permissions based on information associated with the individual user profile; updating the profile tranche based on the updated individual user permissions.

In another embodiment, a system for automatically assigning one or more user permissions includes: a communication interface for sending data over a network; a processor capable of executing one or more processor-executable instructions; and a memory storing one or more processor executable instructions that when executed by the processor cause the system to: access a permissions database including individual user permissions associated with individual user profiles and assigning initial individual user permissions to an individual user profile; assign the initial individual user profile to an initial profile tranche based on the initial individual user permissions; update one or more of the individual user permissions based on information associated with the individual user profile; update the profile tranche based on the updated individual user permissions.

In yet another embodiment, a method of updating individual user permissions includes receiving a custom first set of individual user permissions from a first user; comparing the custom first set of individual user permissions from the first user to a tranche of user permissions; comparing the individual user profile of the profile having the custom first set of individual user permissions to a second individual user profile of a second user having a second set of individual user permissions; and updating the custom first set of individual user permissions of the first user based on the comparison of the individual user permissions with the tranche of user permissions and the first individual user profile with the second individual user profile.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 5 is a flowchart depicting a method for automatically assigning one or more user permissions.

FIG. 6 is another flowchart depicting a method for automatically assigning one or more user permissions.

DETAILED DESCRIPTION

Systems and methods described herein relate to automatically assigning user permissions based on user meta data and a predefined set of rules. The predefined set of rules may use the metadata associated with the user profile and automatically assign permissions to a user account based thereon. In some embodiments, the permissions may be automatically assigned subject to an override of the automatic selection by a user admin. The predefined sets of rules may be generally based on a user's level of experience within an organization, his or her role or job function within the organization, or other aspects of the user's profile. So, for example, a user with a higher level of organizational responsibility (e.g., Chief Executive, Department Head, etc.) may generally have a higher level of permissions than a person with a lower level of responsibility within the organization (e.g., Technician, etc.)

By automatically assigning user permissions, an organization may run more efficiently because system admins, who would normally have the job of assigning user permissions on a user-by-user basis, may no longer need to spend such time assigning permissions. This, in turn, may make systems safer, as user errors associated with the assignment of improper permissions and other user errors may be avoided. Additionally, as there are generally fewer individuals with higher levels of responsibility in an organization, a system admin may be generally more free to focus on the permission levels of higher level individuals within an organization, for which mistaken permissions could be more consequential (e.g., it may be more consequential to mistakenly give someone universal write and execute privileges than to give someone universal read privileges).

The following disclosure provides one or more systems and methods for automatically assigning permissions to reduce the burden on these system admins. For example, in one exemplary embodiment, a method of updating user permissions may include accessing a permissions database including individual user permissions associated with individual user profiles and assigning initial individual user permissions to an individual user profile; assigning the initial individual user profile to an initial profile tranche based on the initial individual user permissions; updating one or more of the individual user permissions based on information associated with the individual user profile; updating the profile tranche based on the updated individual user permissions.

Figure 1:
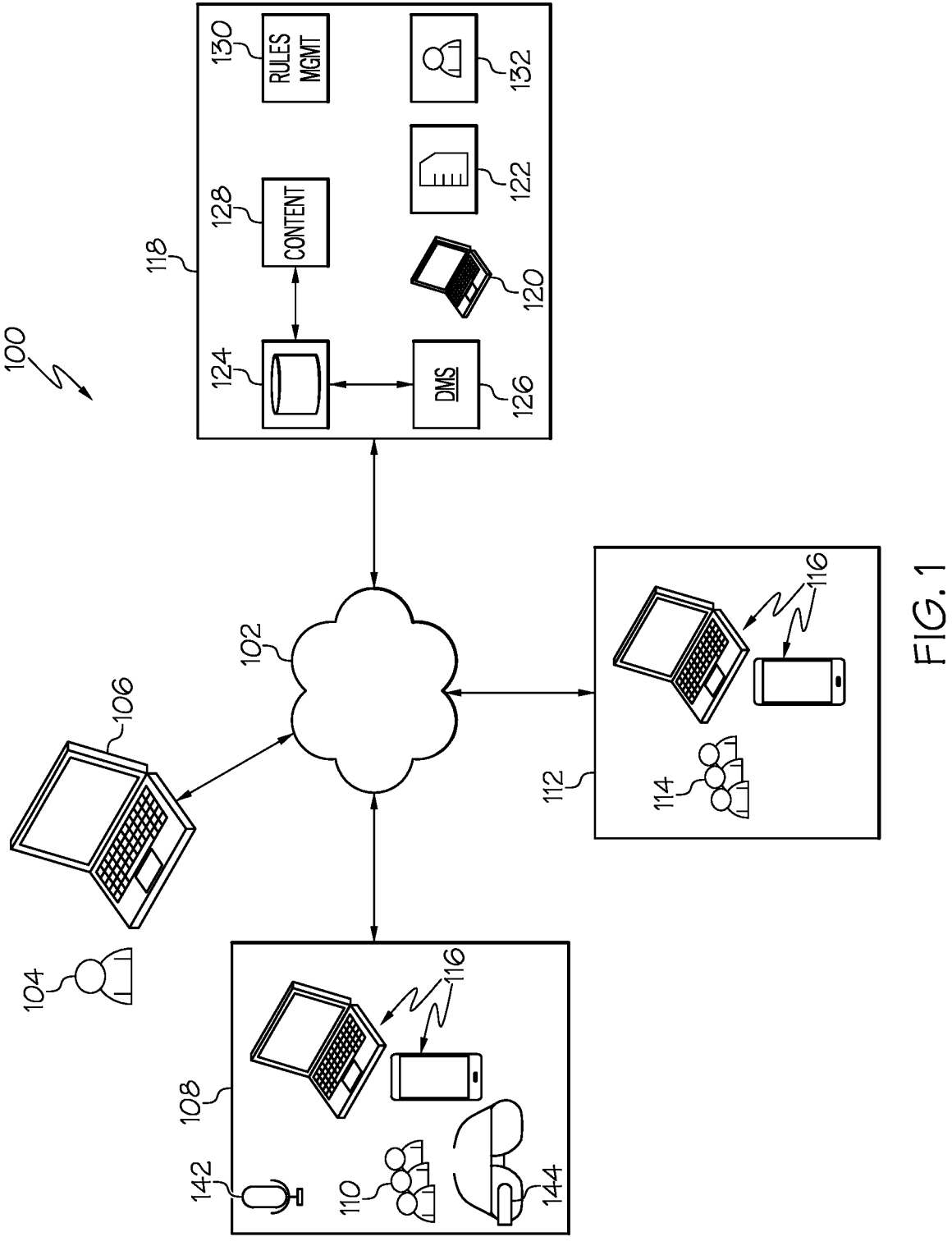
FIG. 1 illustrates an exemplary computing environment for implementing one or more of the systems and methods described herein.

Referring to FIG. 1, a system 100 for automatically assigning user permissions is shown. The system 100 may include a plurality of nodes comprising one or more processing devices (e.g., personal computers, computer networks, personal devices, device networks, etc.) communicatively coupled to a network 102 via one or more communication interfaces (e.g., modem, router, transceiver, etc.) One or more users may be connected to the network 102. For example, an admin user 104 may connect to the network through an admin device 106. In embodiments, users may be grouped according to one or more similar characteristics. For example, the users may be grouped according to a department of the users, a primary geographical location of the users, a primary language of the users, etc. In some embodiments, a first grouping 108 may include one or more users 110 and a second grouping 112 may include one or more users 114. The users may connect to the network 102 via user devices 116. The users may each have individual access permissions and/or various groups of users may be assigned access permissions as will be described in greater detail herein. In some embodiments, the first grouping 108 and the second grouping 110 may be, for example, tenants accessing a multi-tenant database (e.g., a file management system) for which it may be efficient to create similar and/or common permissions. In other embodiments, the first grouping 108 and the second grouping 112 may be various departments or sectors of a singularly-controlled organization (e.g., a company, firm, etc.) for whom it may be efficient to create similar and/or common permissions. These two types of groups are merely non-limiting examples and it is to be understood that the first grouping 108 and the second grouping 112 may have any relationship within the organization.

A file management system may include or be comprised on a document management server (DMS) 118, which DMS 118 may be communicatively coupled to the network 102. The DMS 118 may comprise one or more processing devices 120, one or more memory devices 122, one or more databases 124 (or repositories, content repositories, etc.), a quality management solution (QMS) module 126, a content module 128, a rules management module 130, and a user profile module 132. In some embodiments, one or more of the users 110 may provide inputs to the system 100 via one or more input devices. For example, the users 110 may provide input to the system 100 via an audible input 142 and/or a hands-free input 144. The audible input 142 may be communicatively coupled to, for example, software for understanding one or more speech inputs and the hands-free input 144 may be capable of receiving and providing to the system 100 one or more inputs based on visual and/or audible data (e.g., by scanning a QR code, etc.)

The network 102 may be used to transmit data from the various data processing devices to the server (e.g., a computer of any appropriate configuration) in an appropriate manner. For instance, the data processing device(s) and the server may communicate over a local area computer network (LAN) or a public computer network (e.g., the Internet). In some embodiments, the network 102 may be a private LAN and may be separated from the public Internet by, for example, a firewall. The information associated with assigning user permissions may be transmitted from the server to one or more of the nodes in any appropriate manner. For instance, the server and a node (e.g., a personal computer; a desktop computer; a laptop computer; a "dumb" terminal) at any location connected to the network may communicate over a computer network, such as a public computer network (e.g., the Internet). A web application may be used to view search results as well.

The one or more processors 120 may communicatively couple with the one or more memory devices to perform one or more of the computer-based methods described herein. The DMS 118 may enable users to manage one or more types of files such as, for example, text-based files, image-based files, charts, presentations, images, videos, sounds, and other types of files. The DMS 118 may present one or more interfaces including a query function, allowing users to search a connected database (e.g., an open source, distributed search and analytics tool) and may provide search results using a search engine that can conduct a search of the relevant databases communicatively coupled to a device of the user. In some embodiments, the relevant databases may be automatically selected for a given search based on a profile of the user (as determined, for example, with the user profile module 132). The automatically selected databases may be a default setting based on, for example, a profile of the user (e.g., to which department a user identity is assigned) and the selected databases may be configurable such that a user can decide which databases the user's queries search.

The QMS 126 may track and control a web of quality events, any one of which could trigger numerous parallel or downstream actions. Quality management may impact every area of the business, and as such quality data must be input and fed from each aspect of the business. The QMS 126 may, for example, reduce the time and risk of error associated with manual process reporting, provide consistent change control processes, speed up critical processes, resulting in greater efficiency overall, simplify finding and linking related records and quality events, improve Corrective Action Preventive Action (CAPA) management, provide auditable assurance that regulatory requirements are met, and give stakeholders and authorized users better visibility into quality across the organization. In some embodiments, the QMS 126 may be a separate or distinct system from the DMS 118.

The content module 128 may include one or more caches or containers for storing corporate documents and other content. For example, the content module 128 may include a repository of documents with text in one or more languages, each document being indexed for the one or more languages it includes text in. In some embodiments, one or more of the stored documents or data may relate to an Annual Product Quality Review (APQR) report. In embodiments, a content type may define how the content is stored in the content module 128. For example, business logic and methods, database structure, definitions (e.g., schema, field, table, etc.) and associated content of different content types may be stored in different manners, accordingly. Business logic and the methods of the module may be configured to act based on particular content items having been stored in the database (e.g., in the case of a particular visualizations or visualization data being stored in one or more aspects of the content module 128).

The rules management module 130 may administrate one or more Business rules for automatically assigning user permissions. The Business rules may define how permissions may be automatically assigned to the one or more users of the system. In some embodiments, the Business rules may assign permissions to a user based on the metadata associated with the user's profile and/or according to a particular profile tranche or permissions tranche in which a user's profile may be assigned as otherwise described herein. In some embodiments, the permissions may include which user can edit a risk event record, which user can read, write, and/or execute a complaints form (for example, make changes to the form), etc. In some embodiments, there may be scores of different permissions maintained within the system. In some embodiments, one or more rules may automatically graduate a user from one tranche to another or vice versa. Such rules could depend, for example, on factors like how long user has been with the department, how often a user processes requests, etc. In some cases, a poorly performing employee can move down the chain of ranks, for example, if a user is not responding to complaints within 2 days for critical complaints, their permissions may be automatically downgraded. Such rules may either move them up or down the allowed roles based on some business configured granular rules.

The user profile module 132 may collect or receive user profile information from the various users of the systems. In some embodiments, the user profile information includes information about the user such as the user's department, the user's role (job function, etc.) within the department or larger organization as a whole, a current or typical location of the user, various certifications or accreditations of a user, or other information. In some embodiments, the user may update information associated with his or her profile individually. For example, a user may input his or her location, preferred language, department information, etc., when creating his or her own user profile (e.g., by selecting from amongst various selections in a drop down) or may assign one or more filters temporarily to his or her profile. For example, if a user knows that they require access to documents or data related to a certain topic at a particular permission level, the user could add such permission or request to add such permission to their profile subject to user admin approval and the permission could affect the Business rules associated with the user profile. User profile information may be collected and stored in a database, for example, a permissions database 208 of FIG. 2 (described in greater detail herein) which permissions database, referring again to FIG. 1, could be stored at the database(s) 124. In some embodiments, user profile information can include, for example, one or more user credentials, an identity of the user, a department assigned to the user, and a duration of employment.

Additionally, the user profile module 132 may maintain a list of typical user profiles or access permissions and may align a user's permissions based on the maintained list of typical user profiles or access permissions. For example, if a brand new user typically does not have access to read/write any documents to the system, the user profile module may automatically assign the typical access permissions to the profile based on the length the profile has been created. The list of typical access permissions is described in greater detail herein. The user profile module 132 may further include one or more aspects for managing user access permissions for example, the user profile module 132 may include one or more identity and access management (IAM) functions. The IAM functions could be enacted using, for example, a connection to one or more IAM databases (e.g., in the database(s) 124). The IAM function could be configured to communicate with other aspects of the system 100 using, for example, one or more connections via the network 102. The IAM function could use an IAM database to store, parse, categorize, or take other actions, for example, access rules, restriction requirements, management information, collected data, correlated data, predication data, behavioral information, and other suitable information, or any combination thereof. Further, the IAM function could dynamically restrict authorized users and access attempts if such users or access attempts occur when the IAM function may vulnerabilities or behaviors that are deemed hostile to the network 102. Accordingly, the IAM function and its use of tracking and monitoring behaviors over a long period of time could provide an added measure of security to any pre-defined policies followed by systems or subsystems communicatively coupled with the IAM function. In some embodiments, the IAM function may restrict access to particular data (e.g., data in a particular language, business analytics data, etc.) or documents or data based on, for example, a department of a user or other aspect of a user's profile.

Figure 2:
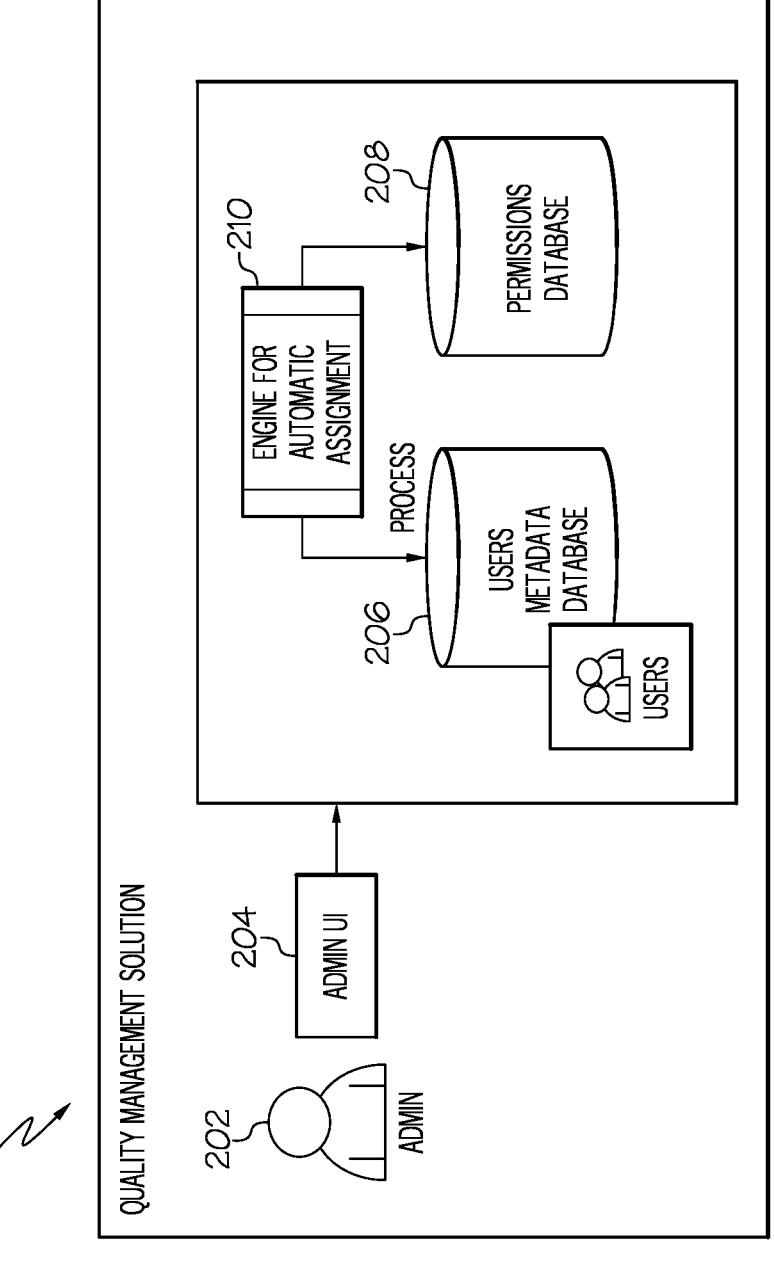
FIG. 2 further illustrates aspects of the exemplary environment of FIG. 1.

Referring to FIG. 2, an exemplary environment 200 for automatically assigning one or more user access permissions is shown. The environment includes a quality management solution (e.g., the QMS 126 of FIG. 1), which QMS may be accessed by a user admin 202 using a user admin user interface 204. The user admin UI 204 may provide access to an engine 210 for automatic assignment of one or more user qualifications or access privileges, which engine 210 may communicatively couple to a users metadata database 206 and a permissions database 208.

The user admin 202 may have various tasks such as, for example, assigning authorized user IDs and passwords, assigning authorization levels and/or individual permissions to Users, and other tasks. The user admin 202 may access and control user permissions using, for example, the user admin user interface 204. A portion of an exemplary user admin user interface 204 is shown in FIG. 3, which is discussed in greater detail herein.

Still referring to FIG. 2, the users metadata database 206 may include metadata associated with each of the users of the system 100. For example, the users 110, the users 114, and/or the admin user 104. The users metadata database may include such information as account creation date, account edit dates, certifications received by a user(s), credentials obtained by a user(s), licenses obtained by a user(s). The metadata associated with the user accounts may be stored in the database as user attributes. In addition to those features already mentioned, user attributes may include one or more of language, location, job, function, experience level, skills, sector, division, industry, and one or more other attributes.

The permissions database 208 may include, for example, both custom and pre-defined permissions. The pre-defined permissions can be assigned, in some embodiments, according to one or more pre-defined tranches of permissions based on criteria associated with the user profile. In embodiments, the custom permissions can be defined granularly based on the needs of a variety of individual users. In some embodiments, a user profile may be assigned a tranche of permissions and later, as the user accumulates more familiarity with the system(s) (which may be evidenced, for example, with one or more certifications, credentials, etc.) the user's permissions may be customized based on the familiarity. To continue with the example, custom permissions can manifest within the system in a variety of ways. For example, the content of a particular file (e.g., an audio/visual file, a text-based file, a presentation, etc.) as accessed by the content module 128 or other component of the DMS 118 can be displayed in a customized way based on the permission levels of the particular user. In some embodiments, permissions may be shared across or between organizations. For example, if the users of the first grouping 108 may share access permissions with the users of the second grouping 112 based on the access needs of the uses in the second grouping 112, and vice versa. In some embodiments, users may share permissions to particular devices or computing resources within the system. For example, the users 110 in the first grouping could share access permissions with the users 114 in the second grouping to the audible input 142 and/or the hands-free input 144 in order to use the audible input 142 and/or the hands-free input 144 to edit and/or create documents.

Figure 3:
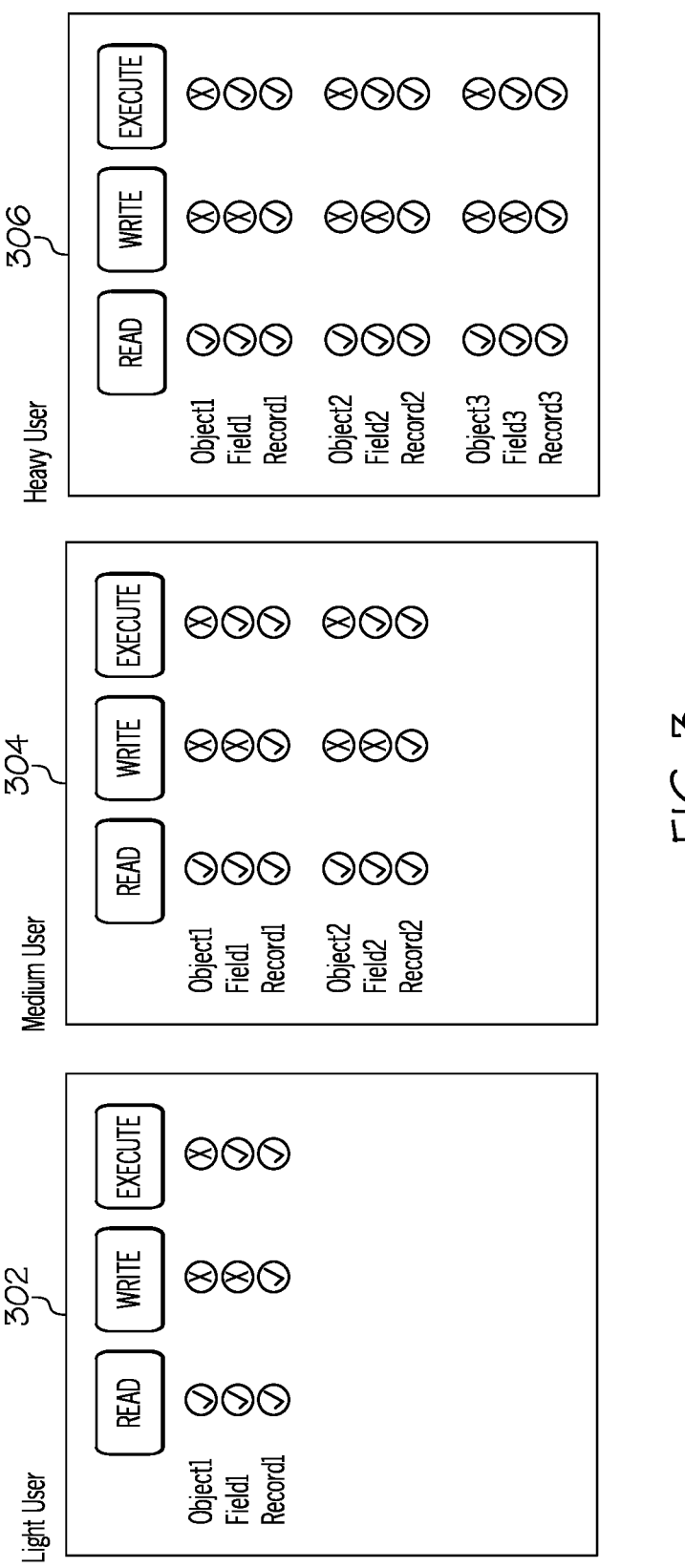
FIG. 3 illustrates various aspects of the exemplary computing environment of FIG. 1.

Referring now to FIG. 3, an exemplary listing of tranches for automatically updating one or more user permissions using, for example, the system of FIGS. 1 and 2 is shown. The tranches can include any set of pre-determined user permissions for a given user type and in some embodiments may include, for example, a light user tranche 302, a medium user tranche 304, and a heavy user tranche 306. As shown in FIG. 3, each of the tranches may describe a particular user's capabilities for reading, writing, and executing with respect to one or more files and/or file types. For example, a light user may be described by the light user tranche 302 as capable of reading to a first object file, a first field file, and a first record file. However, the light user (as described by the light user tranche 302) may have write permissions with respect to the first record file, but may not have write permissions with respect to the first object file and the first field file. As shown, the light user 302 may have execute permissions with respect to a first field file and a first record file but may not have execute permissions with respect to a first execute file. This tranche is merely exemplary and other embodiments having different combinations of permissions is considered.

Figure 4:
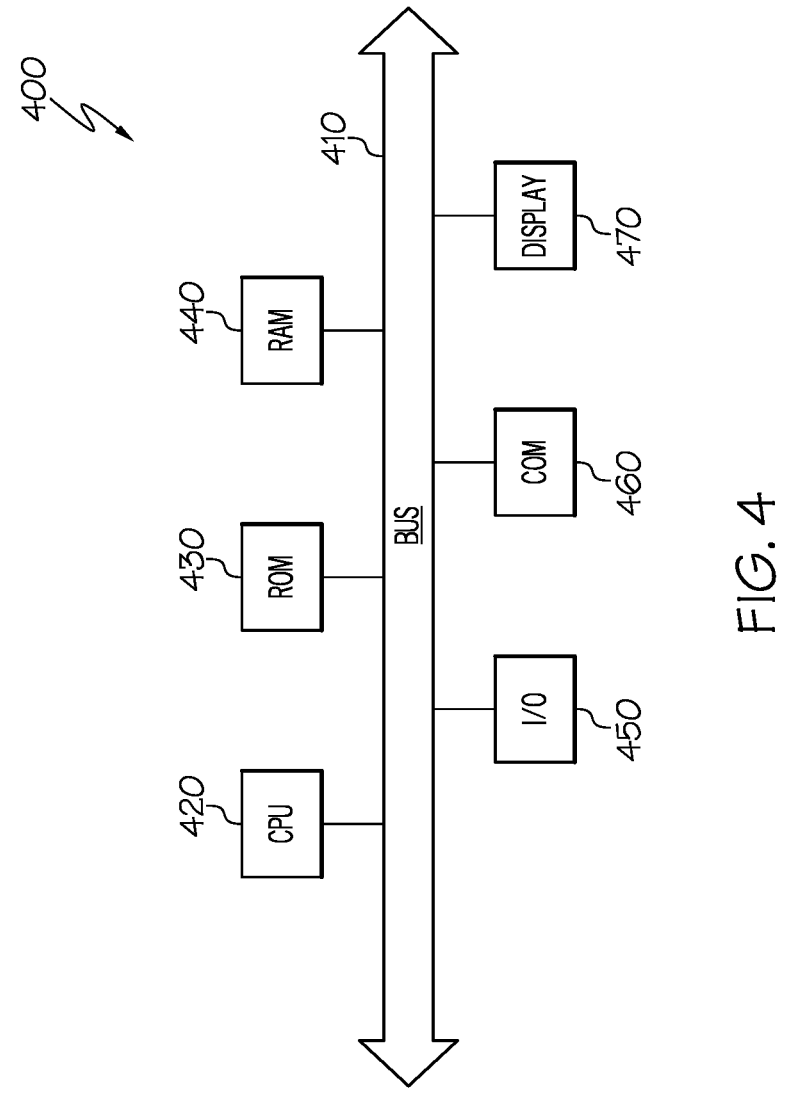
FIG. 4 illustrates an exemplary computing environment including a CPU and multiple storage devices.

FIG. 4 is a simplified functional block diagram of a computing system 400 that may be configured for carrying out one or more of the steps, programs, and/or executing techniques described herein, according to exemplary embodiments of the present disclosure. Specifically, in one embodiment, any of the modules of the system 100 may be an assembly of software and/or hardware including, for example, a data communication interface 460 for packet data communication. The platform may also include a central processing unit ("CPU") 420, in the form of one or more processors, for executing program instructions. The platform may include an internal communication bus 410, program storage, and data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. The system 400 may include one or more displays, such as display 470, for displaying information. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 4 and the following discussion provide a brief, general description of one example of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Referring to FIG. 5, a method 500 for updating a profile tranche based on updated individual user permissions is shown. The method 500 includes the various steps listed therein but it is to be understood that methods having fewer or more steps that that shown in FIG. 5 are contemplated herein.

At step 502, a permissions database may be accessed. The permissions database may include, for example, individual user permissions associated with one or more individual user profiles. The individual user permissions may be assigned to an individual user profile. The permissions database can be, for example, a database stored locally or remotely (e.g., in a cloud environment). In some embodiments, the permissions database may be communicatively coupled to one or more document management systems, content modules, rules databases for storing one or more business rules, or other modules of the system. The permissions database may be accessed by, for example, one or more user admins or other users with appropriate permission levels to access the permissions database. The permissions database can include permissions such as, for example, read, write, execute, edit, view, account management, and other permissions and permissions can be specific to one or more individual objects, fields, records, or other forms of data. In some embodiments, individual user permissions may include, for example, temporary individual user permissions. In embodiments, temporary user permissions may have a default expiration data.

At step 504, the initial individual user profile may be assigned to an initial profile tranche based on the initial individual user profile permissions. The user profile tranche can be a grouping of user profiles with similar characteristics. In some embodiments the similar characteristics can include information related to the permissions of a user to, for example, read, write, execute, edit, view, account manage, and one or more other permissions. In some embodiments, the tranches may be labeled, for example, "light," "medium," and "heavy," to generally refer to a scale of increasing user permissions. But this is, of course, merely one example. In some embodiments, a user profile may be separated into various tranches based on seniority within the organization. For example, a user may automatically be changed from one tranche to another and permissions associated with the different tranches may be given to a user profile based on time within the organization (e.g., the time that a user account has existed). In some embodiments, a user's profile may be downgraded in tranche based on a time that the user has not accessed a system or certain documents. For example, if a user has not executed documents or accessed particular types of files (e.g., QA files, APQR files, etc.) within a particular amount of time, the user's profile may be downgraded with respect to permissions to read, write, execute for that type of file, related file types, or other files based on having not accessed the file type or other aspects of the system.

At step 506, one or more of the individual user permissions may be updated based on information associated with the individual user profile. For example, if a user attains particular credentials (e.g., graduates from internal or external educational courses, obtains government or professional licenses, etc.) the user's permissions to access, create, or edit particular documents or file types may be updated. As one example, if a user who previously had access only to read documents associated with a pharmaceutical's quality control processes obtains an advanced degree in pharmacology, the user's individual user profile may be updated as having obtained such certification, licensure, degree, etc. and the individual profile permissions may be updated accordingly. Henceforth, the user may be capable of accessing and editing documents associated with a pharmaceutical's quality control processes because the certification, licensure, degree, etc. may witness a degree of skill or competence with respect to pharmaceuticals and/or quality control. This is, of course, merely one example of the type of permissions and/or system access that can be updated based on the user's individual profile being updated. In some embodiments, a user profile may be associated with one or more milestone criteria, which milestone criteria may be related to, for example, one or more certifications, licensures, degrees, one or more number of tasks completed within the organization, etc. In some embodiments, the profile tranche may be determined from a plurality of profile tranches including light, medium, and heavy profile tranches and the light profile tranche may be associated with a fewest number of user permissions and the heavy profile tranche may be associated with a highest number of user permissions. In some embodiments, milestone criteria may include, for example, generating, reviewing, and/or editing a threshold number of quality control documents (e.g., complaint files) and/or generating, reviewing, and/or editing a threshold number of corrective and preventive action documents. In some embodiments, especially those having temporary permissions, the temporary individual user permissions may cause a profile tranche to update temporarily.

At step 508, the profile tranche may be updated based on the updated individual user permissions. For example, if a sufficient number of user's in a tranche have a particular permission but the tranche is not necessarily associated with the given permission that the user's tend to have, the tranche may be updated to require such permission in order to be a member of the tranche. In some embodiments, the system may be configured to request to update the tranche from, for example, a user admin or other user with sufficient permissions to manage the permissions required of any individual tranche. For example, if an admin notes that may users in a heavy user tranche have permissions to write to a particular field (e.g., field2 in FIG. 3), the admin may have the capability to automatically update the user permissions of all the users in the heavy tranche to be able to update that particular field. Such capabilities may enable user admins to quickly and efficiently update the user profiles of many users simultaneously saving user admins from needing to update individual profiles one-by-one.

Referring to FIG. 6, another method 600 for updating a custom set of individual user permissions is shown. The method 600 includes the various steps listed therein but it is to be understood that methods having fewer or more steps that that shown in FIG. 6 are contemplated herein.

At step 602, a custom first set of individual user permissions from a first user may be received. The set of individual user permissions may be received, for example, by a user admin creating a new account and assigning initial user permissions with the new account. The permissions may be received at a user profile module and may be stored along with the user profile information (e.g., name, location, unique identification information, etc.) The user can be any level of user with a need for one or more accesses to the system. For example, a need to access at least some document or other files on the system. The user profile information can be stored, for example, in a user profile module, which user profile module may be communicatively coupled to one or more document management systems, file management systems, quality management solutions, or other applications capable of accessing file databases and creating and editing files within the database. For example, the user permissions may give a user the requisite permissions to create one or more quality assurance documents and to store the quality assurance documents within the system.

At step 604, a custom first set of individual user permissions from the first user may be compared to a tranche of user permissions. The custom set could be different (i.e., include one or more distinct permissions from the tranche) or the same as the tranche. The tranche can be a grouping, set, or subset of individual user permissions that are typical for a given type of profile. For example, a "light," "medium," or "heavy" user with a general trend of more permissions along the spectrum. This is, of course, merely one example. In some embodiments, the profile tranches may be stored in a user profile module or other module of the system and may be editable by a user admin. To continue with the example above, a user who may have a profile that may be comparable to a group of permissions reflected in the "light" tranche may only have access to read certain quality assurance documents. In some embodiments, a user who may have a profile that may be comparable to a group of permissions reflected in the "light" tranche may only have access to quality assurance documents, but may have the capability to read, write, or execute based on or within those documents. In some embodiments, a user who may have a profile that may be comparable to a group of permissions reflected in the "light" tranche may only have access to read documents, but may have general access to read all documents within a document management system, a quality management solution, etc. or to read all documents generated by a particular department within the document management system, quality management solution, etc. (e.g., all documents generated by a quality assurance department, for example). The various combinations of access privileges and permissions to read, write, execute within accessible documents are not limited to any particular combination.

At step 606, the individual user profile of the profile having the custom first set of individual user permissions ("first profile") may be compared to a second individual user profile of a second user having a second set of individual user permissions ("second profile"). The first profile and the second profile can be profiles of users with any level or set of permissions. The profiles may be stored, for example, in a user profile module along with other user profiles. For example, one user profile may be for a manager for a department and the other user profile may be for an incoming manager of the same department. The managers may require a similar set of permissions as their role within the organization is likely to be similar. Accordingly, the system may be configured to so as to provide both sets of users with the same permissions as described herein. This, of course, is merely one embodiment and users with different roles can have similar profiles based on the individual needs of the user and vice versa. Individuals with the same role could have different permissions for their user profiles, which differences could be based on, for example, a difference in time with an organization, a difference in credentialing, etc.

At step 608, the custom first set of individual user permissions of the first user may be updated based on the comparison of the individual user permissions with the tranche of user permissions and the first individual user profile with the second individual user profile. Hence, the first profile may be updated to include user permissions that are the same as the tranche of user permissions and/or that are the same as the second user profile. To continue with the example above, the incoming manager may be given permissions the same as the outgoing manager, even if he or she does not have a similar amount of time with the organization and/or does not meet the same or similar credentialing as the outgoing manager. Such permissions may be required such that the incoming manager can read, write, and execute all files necessary to perform the role of manager. This example is, of course, merely exemplary and users may have any set of permissions required as necessary to perform their role or based on their specific situation.

In some embodiments, permissions may lapse if a user does not continue to meet all requirements for having a particular permission or set of permissions. For example, a permission to execute a given file type or set of files may lapse based on a change in role (e.g., a demotion/promotion, etc.) or may change based on the lapsing of a particular credential or qualification. In some embodiments, users may request an updated user profile based on reevaluation of their profile after circumstances have changed with respect to the reason that a permission may have lapsed (e.g., if a user is recertified, etc.)

It should now be understood that systems and methods can be used to automatically update a user's set of permissions based on a tranche of user permissions and/or based on one or more comparisons with other users. Based on automatic updates of permissions of user profiles, a system may be run more efficiently, saving system administrators time and labor. This may be particularly important in annually required documents that require input from vast numbers of stakeholders, such as an Annual Product Quality Review (APQR). By automatically assigning user permissions, APQR documents may be generated more efficiently and with less organizational expenditure.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method of updating user permissions comprising:
accessing a permissions database including individual user permissions associated with individual user profiles and assigning initial individual user permissions to an individual user profile;
assigning the individual user profile to a profile tranche based on the initial individual user permissions;

updating one or more of the individual user permissions based on information associated with the individual user profile;
updating, automatically, the profile tranche based on the updated individual user permissions by:
updating the profile tranche to require a permission when a sufficient number of users in the profile tranche have the permission, and
automatically updating the user permissions of all the users in the profile tranche; and
storing the updated profile tranche and the updated individual user permissions in the permissions database.

2. The method of claim 1, wherein the information associated with the individual user profile used to update the one or more individual user permissions includes one or more user credentials, an identity of a user, a department assigned to the user, and a duration of employment.

3. The method of claim 2, wherein the profile tranche is further updated based on one or more milestone criteria.

4. The method of claim 3, wherein the profile tranche is determined from a plurality of profile tranches including light, medium, and heavy profile tranches and the light profile tranche is associated with the fewest user permissions and the heavy profile tranche is associated with the most user permissions.

5. The method of claim 3, wherein the milestone criteria includes generating a threshold number of complaint files and generating a threshold number of corrective and preventive action documents.

6. The method of claim 1, wherein the individual user permissions include permissions to read, write, and execute, the execute permission is a higher permission level than the write permission and the read permission, and the write permission is a higher permission level than the read permission.

7. The method of claim 6, wherein updating the profile tranche to a higher profile causes one or more individual user permissions to increase to at least one higher level of permission.

8. The method of claim 1, wherein the individual user permissions include at least some temporary individual user permissions, which temporary user permissions have a default expiration data.

9. The method of claim 8, wherein the temporary individual user permissions cause the profile tranche to update temporarily.

10. The method of claim 9, wherein the profile tranche automatically decreases to a lower level based on an expiration of a temporary individual user permission that caused the profile tranche to update temporarily to a higher level.

11. A system for automatically assigning one or more user permissions comprising:
a communication interface for transmitting data over a network;
a processor capable of executing one or more processor-executable instructions; and
a memory storing one or more processor executable instructions that when executed by the processor cause the system to:
access a permissions database including individual user permissions associated with individual user profiles and assigning initial individual user permissions to an individual user profile;
assign the individual user profile to a profile tranche based on the initial individual user permissions;

update one or more of the individual user permissions based on information associated with the individual user profile;

update, automatically, the profile tranche based on the updated individual user permissions by:

updating the profile tranche to require a permission when a sufficient number of users in the profile tranche have the permission, and automatically updating the user permissions of all the users in the profile tranche; and storing the updated profile tranche and the updated individual user permissions in the permissions database.

12. The system of claim 11, wherein the information associated with the individual user profile used to update the one or more individual user permissions includes one or more user credentials, an identity of a user, a department assigned to the user, and a duration of employment.

13. The system of claim 12, wherein the profile tranche is further updated based on one or more milestone criteria.

14. The system of claim 13, wherein the profile tranche is determined from a plurality of profile tranches including light, medium, and heavy profile tranches and the light profile tranche is associated with the fewest user permissions and the heavy profile tranche is associated with the most user permissions.

15. The system of claim 13, wherein the milestone criteria includes generating a threshold number of complaint files and generating a threshold number of corrective and preventive action documents.

16. The system of claim 11, wherein the individual user permissions include permissions to read, write, and execute, the execute permission is a higher permission level than the write permission and the read permission, and the write permission is a higher permission level than the read permission.

* * * * *